(12) United States Patent
Hoffman et al.

(10) Patent No.: US 8,591,377 B1
(45) Date of Patent: Nov. 26, 2013

(54) MULTI-SPEED AUTOMATIC TRANSMISSION

(75) Inventors: Donald E. Hoffman, Canton, MI (US); Reid A. Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/482,026

(22) Filed: May 29, 2012

(51) Int. Cl.
*F16H 3/44* (2006.01)

(52) U.S. Cl.
USPC .......................................................... 475/285

(58) Field of Classification Search
None
See application file for complete search history.

(56) References Cited

U.S. PATENT DOCUMENTS

| | | | | |
|---|---|---|---|---|
| 6,558,287 B2* | 5/2003 | Hayabuchi et al. | ............ | 475/271 |
| 6,752,737 B2* | 6/2004 | Ishimaru et al. | .............. | 475/275 |
| 6,790,155 B2* | 9/2004 | Ishimaru | ....................... | 475/275 |
| 6,863,635 B2* | 3/2005 | Tsuga | ............................ | 475/275 |
| 6,878,087 B2* | 4/2005 | Tsuga | ............................ | 475/284 |
| 6,884,197 B2* | 4/2005 | Ishimaru et al. | .............. | 475/271 |
| 6,905,434 B2* | 6/2005 | Sugihara et al. | ............... | 475/276 |
| 6,910,985 B2* | 6/2005 | Ishimaru et al. | .............. | 475/275 |
| 6,918,852 B2* | 7/2005 | Choi | .............................. | 475/284 |
| 6,935,985 B2* | 8/2005 | Ishimaru | ........................ | 475/296 |
| 6,991,578 B2* | 1/2006 | Ziemer | ........................... | 475/296 |
| 7,037,232 B2* | 5/2006 | Ishimaru | ........................ | 475/275 |
| 7,052,431 B2* | 5/2006 | Taguchi et al. | ................ | 475/284 |
| 7,276,011 B2* | 10/2007 | Tabata et al. | ................... | 475/276 |
| 7,452,303 B2* | 11/2008 | Seo | ................................ | 475/284 |
| 7,462,126 B2* | 12/2008 | Fukuyama et al. | ............ | 475/284 |
| 7,604,563 B2* | 10/2009 | Phillips | ........................... | 475/280 |
| 7,618,342 B2* | 11/2009 | Kim | ................................ | 475/287 |
| 7,621,841 B2* | 11/2009 | Kim | ................................ | 475/287 |
| 7,727,103 B2* | 6/2010 | Seo | ................................ | 475/275 |
| 7,780,566 B2* | 8/2010 | Seo | ................................ | 475/276 |
| 7,846,058 B2* | 12/2010 | Kim | ................................ | 475/280 |
| 7,850,569 B2* | 12/2010 | Seo et al. | ....................... | 475/281 |
| 7,854,678 B2* | 12/2010 | Kim | ................................ | 475/276 |
| 7,988,589 B2* | 8/2011 | Seo et al. | ....................... | 475/284 |
| 8,029,405 B2* | 10/2011 | Kim | ................................ | 475/280 |
| 8,100,809 B2* | 1/2012 | Taniguchi et al. | ............. | 475/284 |
| 8,303,456 B2* | 11/2012 | Kim | ................................ | 475/284 |

* cited by examiner

*Primary Examiner* — Dirk Wright
(74) *Attorney, Agent, or Firm* — James Dottavio; MacMillan, Sobanski & Todd, LLC

(57) ABSTRACT

A power transmission includes an input; an output; a first gearset including an output having a lower speed than a speed of the input; a second gearset having first, second, and third rotating elements; a second gearset having fourth, fifth, sixth, and seventh rotating elements; four clutches; and two brakes. The brakes and clutches are engaged in combinations of three to produce up to eleven forward speed ratios and two reverse speed ratios.

23 Claims, 4 Drawing Sheets

| Element Number | Number of Teeth |
|---|---|
| 22 | 40 |
| 24 | 88 |
| 28 | 24 |
| 32 | 40 |
| 34 | 88 |
| 38 | 24 |
| 42 | 53 |
| 44 | 39 |
| 46 | 91 |
| 50 | 19 |
| 52 | 18 |

Fig. 2

| Gear Node | Clutch A 56 Schedule | Clutch B 58 Schedule | Clutch C 60 Schedule | Brake D 62 Schedule | Clutch E 64 Schedule | Brake F 66 Schedule | Ratio |
|---|---|---|---|---|---|---|---|
| Low | X | | X | X | | | 6.0718 |
| 1st | X | | | X | | X | 4.9366 |
| 2nd | X | | X | | | X | 3.1540 |
| 3rd | X | X | | | | X | 2.1157 |
| 4th | X | X | X | | | | 1.4545 |
| 5th | X | | X | | X | | 1.0809 |
| 6th | X | X | | | X | | 1.0000 |
| 7th | | X | X | | X | | 0.8460 |
| 8th | | X | | | X | X | 0.7650 |
| 9th | | | X | | X | X | 0.6319 |
| Rev | | X | | X | | X | -3.6326 |
| Alt Rev. | | X | X | X | | | -2.4674 |
| Alt 5th | X | | | | X | X | 1.2920 |

Fig. 3

|  | Sun | Ring | Pinion | Beta |
|---|---|---|---|---|
| Plan 1 | 40 | 96 | 27 | 2.400 |
| Plan 2 | 50 | 115 | 33 | 2.300 |
| Plan 3 |  | 91 | 20 | 1.784 |
| Plan 4 | 51 | 91 | 20 | 1.784 |
| Plan 5 | 53 | 121 | 34 | 2.283 |

Fig. 6

|  | Clutch 138 | Clutch 130 | Brake 106 | Brk 134 /owc | Clutch 136 | Clutch 132 |
|---|---|---|---|---|---|---|
| 1st | X |  |  | X |  | X |
| 2nd | X |  | X | X |  |  |
| 3rd | X |  | X |  |  | X |
| 4th | X | X | X |  |  |  |
| 5th | X | X |  |  |  | X |
| 6th | X |  | X |  | X |  |
| 7th | X |  |  |  | X | X |
| 8th | X | X |  |  | X |  |
| 9th |  | X |  |  | X | X |
| 10th |  | X | X |  | X |  |
| 11th |  |  | X |  | X | X |
| Rev |  | X | X | X |  |  |
| Alt Rev. |  | X |  | X |  | X |

Fig. 7

MULTI-SPEED AUTOMATIC TRANSMISSION

BACKGROUND OF THE INVENTION

This invention relates to the field of automatic transmissions for motor vehicles. More particularly, the invention pertains to a kinematic arrangement of gearing, clutches, brakes, and the interconnections among them in a power transmission.

SUMMARY OF THE INVENTION

A power transmission includes an input, output, a gearset including an output having a lower speed than a speed of the input, second sun gear, second ring gear driveably connected to the output of the gearset, second carrier, second pinions supported on the second carrier and meshing with the second sun gear and the second ring gear, a third sun gear, a fourth sun gear, a third ring gear driveably connected to the output, a third carrier, third pinions supported on the third carrier and meshing with the third sun gear and the third ring gear, and fourth pinions meshing with the fourth sun gear and the third pinions.

The transmission provides ten forward gears or speed ratios (nine forward gears and a special purpose low gear), and two reverse gears. There is also an alternative forward gear ratio that can be selected, making a total of eleven forward ratios. The gearsets are controlled by six control elements—four clutches and two brakes. Three of the control elements are engaged and three are disengaged in order to produce each of the forward and reverse gears.

The transmission is applicable to front wheel drive and rear wheel drive vehicles.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is a table showing a preferred number of teeth for the gears and pinions of the transmission of FIG. 1;

FIG. 3 is a table indicating the states of the clutches and brakes corresponding to the forward and reverse speed ratios of the transmission of FIG. 1 when the gears have the number of teeth indicated in FIG. 2;

FIG. 6 is a table showing a preferred number of teeth for the gears and pinions of the transmission of FIG. 5; and FIG. 7 is a table indicating the states of the clutches and brakes corresponding to forward and reverse speed ratios of the transmission of FIG. 5.

DESCRIPTION OF THE PREFERRED EMBODIMENT

Figure 1:
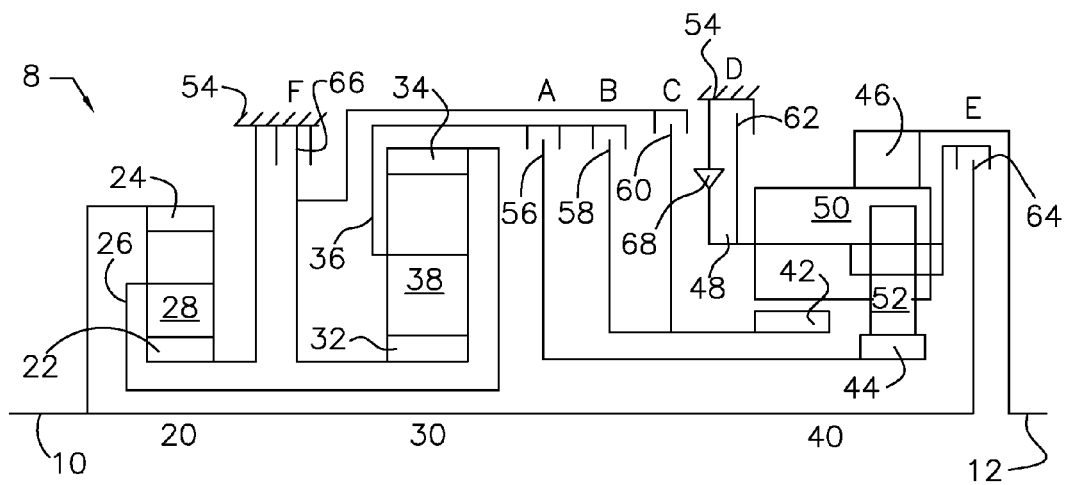
FIG. 1 is a schematic diagram showing a kinematic arrangement of a multi-speed transmission.

A transmission 8 according to a first embodiment is illustrated schematically in FIG. 1. Input shaft 10 is driven by a vehicle engine, preferably through a torque converter. Output shaft 12 drives the vehicle wheels, preferably through a differential.

A simple, planetary, epicyclic, speed reduction gearset 20 includes a sun gear 22 having external gear teeth that are continually held against rotation, a ring gear 24 having internal gear teeth and secured to input shaft 10, a planet carrier 26, and a set of planet pinions 28 supported for rotation on carrier 26 and meshing with both sun gear 22 and ring gear 24. If the speed of input shaft 10 is 1.00, the speed of carrier 26 is about 0.6875 provided the gears and pinions have the number of teeth shown in FIG. 2. Carrier 26 and ring gear 34 comprise a second input.

A second simple, planetary, epicyclic gearset 30 includes a sun gear 32 having external gear teeth, a ring gear 34 having internal gear teeth, a planet carrier 36, and a set of planet pinions 38 supported for rotation on carrier 36 and meshing with both sun gear 32 and ring gear 34. Brake 66 selectively holds sun gear 32 against rotation. If the speed of ring gear 34 is 0.6875, the speed of carrier 36 is about 0.4727 provided brake 66 is applied and the gears and pinions have the number of teeth shown in FIG. 2.

A Ravigneaux epicyclic gearset 40 includes a sun gear 42 having external gear teeth, a sun gear 44 having external gear teeth, a ring gear 46 having internal gear teeth, a planet carrier 48, a set of planet pinions 50 supported for rotation on carrier 48 and meshing with sun gear 42 and ring gear 46, and a set of planet pinions 52 supported for rotation on carrier 48 and meshing with sun gear 44 and pinions 50.

Ring gear 24 is connected directly to the input shaft 10. Carrier 26 is connected directly to ring gear 34. Sun gear 22 is held fixed against rotation on the transmission casing 54. Ring gear 46 is connected directly to the transmission output shaft 12.

Four rotating clutches, preferably multi-plate friction clutches, connect rotating elements to one another such that they rotate as a unit when hydraulic pressure is applied to a hydraulic servo that controls the clutch. Clutch 56 selectively connects carrier 36 to sun gear 44. Clutch 58 selectively connects carrier 36 to sun gear 42. Clutch 60 selectively connects sun gear 32 and brake 66 to a sun gear 42. Clutch 64 selectively connects carrier 48 to input shaft 10.

Brake 62 selectively holds carrier 48 against rotation. A one-way brake 68 arranged in parallel with brake 62 between the transmission casing 54 and carrier 48 allows for non-synchronous gear shifts between low gear and $2^{nd}$ gear and between $1^{st}$ gear and $2^{nd}$ gear.

Brake 66 selectively holds sun gear 32 against rotation.

Suggested tooth numbers for the gears and pinions are shown in FIG. 2.

FIG. 3 indicates the engaged and disengaged states of the clutches and brakes for each of the forward speed ratios, a reverse speed ratio, an alternate reverse speed ratio, and an alternate fifth gear.

To launch the vehicle from rest in 1st gear, hydraulic pressure is applied to engage clutch 56, brake 62 and brake 66 while all other brakes and clutches are disengaged.

To shift from 1st gear to 2nd gear, brake 62 is disengaged while clutch 60 is engaged, while maintaining clutch 56 and brake 66 engaged and all other brakes and clutches disengaged.

To shift from 2nd gear to 3rd gear, clutch 60 is disengaged while clutch 58 is engaged, while maintaining clutch 56 and brake 66 engaged and all other brakes and clutches disengaged.

To shift from 3rd gear to 4th gear, brake 66 is disengaged while clutch 60 is engaged while maintaining clutch 56 and clutch 58 engaged and all other brakes and clutches disengaged.

To shift from 4th gear to 5th gear, clutch 58 is disengaged while clutch 64 is engaged, while maintaining clutch 56 and clutch 60 engaged and all other brakes and clutches disengaged.

To shift from 5th gear to 6th gear, clutch 60 is disengaged while clutch 58 is engaged while maintaining clutch 56 and clutch 64 engaged and all other brakes and clutches disengaged. Clutch 56 remains engaged while operating in 1st through 6th gears.

To shift from 6th gear to 7th gear, clutch 56 is disengaged while clutch 60 is engaged while maintaining clutch 58 and clutch 64 engaged and all other brakes and clutches disengaged.

To shift from 7th gear to 8th gear, clutch 60 is disengaged while brake 66 is engaged while maintaining clutch 58 and clutch 64 engaged and all other brakes and clutches disengaged.

To shift from 8th gear to 9th gear, clutch 58 is disengaged, clutch 60 is engaged while maintaining clutch 64 and brake 66 engaged and all other brakes and clutches disengaged. Clutch 64 remains engaged while operating in 5th through 9th gears.

To shift from 3rd gear to the alternate 5th gear, clutch 58 is disengaged, clutch 64 is engaged, clutch 56 and brake 66 remain engaged, and all other brakes and clutches disengaged.

To shift from the alternate 5th gear to 6th gear, brake 66 is disengaged while clutch 58 is engaged, clutch 56 and clutch 64 remain engaged and all other brakes and clutches disengaged.

A special low ratio is also available which may be used for special purposes such as off road usage, high altitude usage, carrying or towing heavy loads, or to enable elimination of a torque converter. This special low ratio is selected by applying clutch 56, clutch 60 and brake 62 while disengaging all other brakes and clutches.

Reverse gear is selected by applying clutch 58, brake 62 and brake 66, while disengaging all other brakes and clutches. An alternate reverse gear is selected by applying clutch 58, clutch 60 and brake 62, while disengaging all other brakes and clutches.

Figure 4:
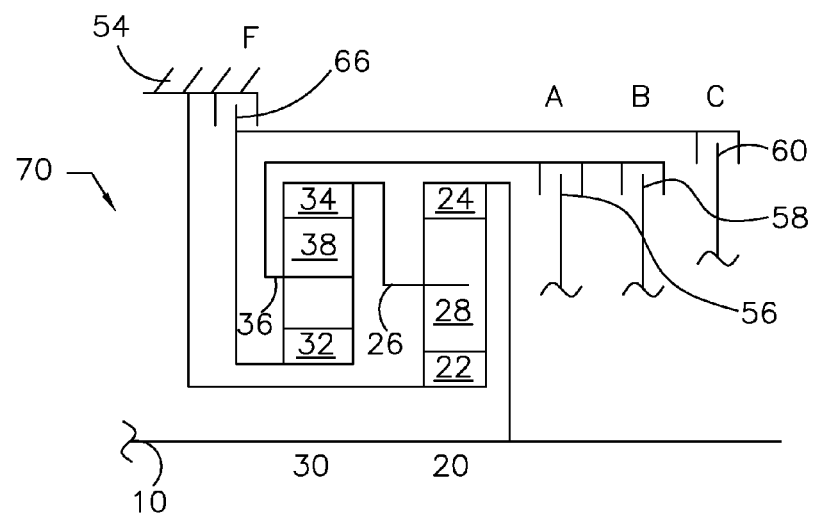
FIG. 4 is a schematic diagram of a front planetary gearset of a second embodiment.

FIG. 4 is a schematic diagram of a second embodiment, wherein the axial positions of gearsets 20 and 30 are reversed with respect to their locations in FIG. 1. As described above, gearset 20 includes sun gear 22 fixed against rotation; a ring gear 24, secured to input shaft 10; a planet carrier 26; and a set of planet pinions 28 supported for rotation on carrier 26 and meshing with both sun gear 22 and ring gear 24. The second gearset 30 includes a sun gear 32, connected to brake 66 and clutch 60; a ring gear 34, secured to carrier 26; a planet carrier 36, connected to clutches 56 and 58; and a set of planet pinions 38 supported for rotation on carrier 36 and meshing with both sun gear 32 and ring gear 34.

Figure 5:
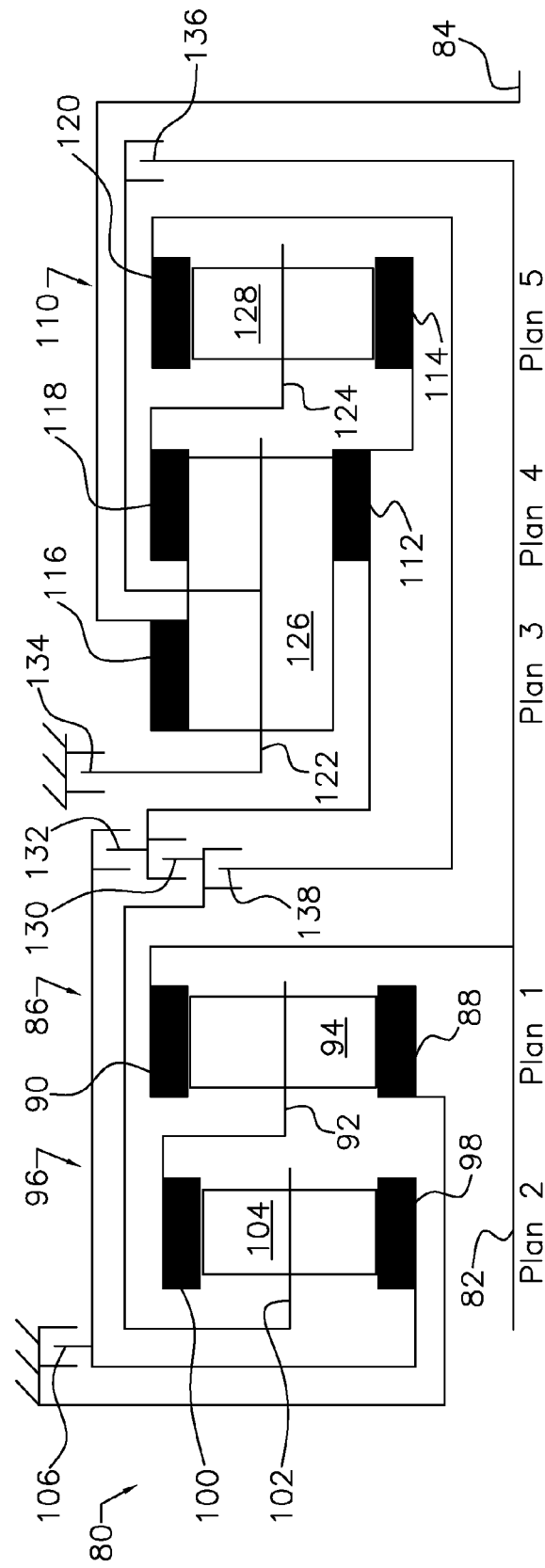
FIG. 5 is a schematic diagram showing a kinematic arrangement of a multi-speed transmission.

A transmission 80 is illustrated schematically in FIG. 5. A first input 82 is driven by a vehicle engine, preferably through a torque converter. Output 84 drives the vehicle wheels, preferably through a differential.

An epicyclic speed reduction gearset 86 includes a sun gear 88 continually held against rotation, a ring gear 90 secured to input 82, a planet carrier 92, and a set of planet pinions 94 supported for rotation on carrier 92 and meshing with both sun gear 88 and ring gear 90. If the speed of input 82 is 1.00, the speed of carrier 92 is about 0.706 provided the gears and pinions have the number of teeth shown in FIG. 6.

A second epicyclic gearset 96 includes a sun gear 98, a ring gear 100 secured to carrier 92, a planet carrier 102, and a set of planet pinions 104 supported for rotation on carrier 102 and meshing with both sun gear 98 and ring gear 100. Brake 106 selectively holds sun gear 98 against rotation. Except for operation in eighth gear, the speed of carrier 102 is less than the speed of input 82 in each of the forward and reverse gears. In eighth gear, the speed of carrier 102 is 1.00 provided the state of the brakes and clutches are as shown in FIG. 7, the gears and pinions have the number of teeth shown in FIG. 6, and the speed of input 82 is 1.00.

A bridging Simpson epicyclic gearset 110 includes mutually connected sun gears 112, 114, ring gears 116, 118, 120, planet carriers 122, 124, a set of planet pinions 126 supported for rotation on carrier 122 and meshing with sun gear 112 and ring gears 116, 118, and a set of planet pinions 128 supported for rotation on carrier 124 and meshing with sun gear 114 and ring gear 120.

Ring gear 116 is connected directly to the output 84. Carrier 124 is connected directly to ring gear 118. Sun gears 112, 114 are connected to clutches 130, 132. Carrier 122 is selectively held fixed against rotation on the transmission casing by brake 134. Carrier 122 is also selectively connected through clutch 136 to input 82 and ring gear 90. Ring gear 120 is connected directly to clutch 138.

The four rotating clutches 130, 132, 136, 138, preferably multi-plate friction clutches, connect rotating elements to one another such that they rotate as a unit when hydraulic pressure is applied to a hydraulic servo that controls the clutch. Clutch 130 selectively connects sun gears 112, 114 to carrier 102. Clutch 132 selectively connects sun gear 98 to sun gears 112, 114. Clutch 136 selectively connects carrier 122 to input 82. Clutch 138 selectively connects ring gear 120 to carrier 102.

Brake 106 selectively holds sun gear 98 against rotation. Brake 134 selectively holds carrier 122 against rotation. A one-way brake, arranged in parallel with brake 134 between the transmission casing and carrier 122, allows for non-synchronous gear shifts between low gear and $2^{nd}$ gear and between $1^{st}$ gear and $2^{nd}$ gear.

Suggested tooth numbers for the gears and pinions are shown in FIG. 6.

FIG. 7 indicates the engaged and disengaged states of the clutches 130, 132, 136, 138 and brakes 106, 134 for each of eleven forward speed ratios, a primary reverse speed ratio, and an alternate reverse speed ratio.

To launch the vehicle from rest in 1st gear, hydraulic pressure is applied to engage clutch 138, brake 134 and clutch 132 while all other brakes and clutches are disengaged.

To shift from 1st gear to 2nd gear, clutch 132 is disengaged, brake 106 is engaged, clutch 138 and brake 134 remain engaged, and all other brakes and clutches remain disengaged.

To shift from 2nd gear to 3rd gear, brake 134 is disengaged, clutch 132 is engaged, clutch 138 and brake 106 remain engaged, and all other brakes and clutches remain disengaged.

To shift from 3rd gear to 4th gear, clutch 132 is disengaged, clutch 130 is engaged, clutch 138 and brake 106 remain engaged, and all other brakes and clutches remain disengaged.

To shift from 4th gear to 5th gear, brake 106 is disengaged, clutch 132 is engaged, clutches 138, 130 remain engaged, and all other brakes and clutches remain disengaged.

To shift from 5th gear to 6th gear, clutches 130, 132 are disengaged, brake 106 and clutch 136 are engaged, clutch 138 remains engaged, and brake 134 is disengaged.

To shift from 6th gear to 7th gear, brake 106 is disengaged, clutch 132 is engaged, clutches 138, 136 remain engaged, and all other brakes and clutches remain disengaged.

To shift from 7th gear to 8th gear, clutch 132 is disengaged, clutch 130 is engaged, clutches 138, 136 remain engaged, and all other brakes and clutches remain disengaged.

To shift from 8th gear to 9th gear, clutch 138 is disengaged, clutch 132 is engaged, clutches 130, 136 remain engaged, and all other brakes and clutches remain disengaged.

To shift from $9^{th}$ gear to the 10th gear, clutch 132 is disengaged, brake 106 is engaged, clutches 130, 136 remain engaged, and all other brakes and clutches remain disengaged.

To shift from $10^{th}$ gear to 11th gear, clutch 130 is disengaged, clutch 132 is engaged, brake 106 and clutch 136 remain engaged, and all other brakes and clutches remain disengaged.

Reverse gear is produced by applying clutch 130, brake 106 and brake 134, while disengaging all other brakes and clutches. An alternate reverse gear is produced by applying clutch 130, brake 134 and clutch 132, while disengaging all other brakes and clutches.

Throughout this description, two elements are connected when they are constrained to rotate at the same speed in all operating conditions. Connections may be effectuated by spline connections, welding, machining from common stock or other means and may involve intermediate parts. Slight variations in relative displacement due to effects such as shaft compliance or lash are permissible. Two elements are releasably connected by a clutch when they are constrained to rotate at the same speed whenever the clutch is engaged and are capable of rotating at different speeds in some other operating condition.

In accordance with the provisions of the patent statutes, the preferred embodiment has been described. However, it should be noted that the alternate embodiments can be practiced otherwise than as specifically illustrated and described.

The invention claimed is:

1. A power transmission, comprising:
   a first input (10);
   a second input having a lower speed than a speed of the first input;
   an output (12);
   a second sun gear (32);
   a second ring gear (34) connected to the second input;
   a second carrier (36);
   second pinions (38) supported on the second carrier and meshing with the second sun gear and the second ring gear;
   a third sun gear (42);
   a fourth sun gear (44);
   a third ring gear (46) driveably connected to the output;
   a third carrier (48);
   third pinions (50) supported on the third carrier and meshing with the third sun gear and the third ring gear; and
   fourth pinions (52) supported on the third carrier and meshing with the fourth sun gear and the third pinions.

2. The power transmission of claim 1, further comprising:
   a first sun gear (22) fixed against rotation;
   a first ring gear (24) connected to the first input (10);
   a first carrier (26) driveably connected to the second input; and
   first pinions (28) supported on the first carrier and meshing with the first sun gear and the first ring gear.

3. The power transmission of claim 1, further comprising:
   a first clutch (56) releasably connecting the second carrier (36) and the fourth sun gear (44);
   a second clutch (58) releasably connecting the second carrier (36) and the third sun gear (42);
   a first brake (62) releasably holding the third carrier (48) against rotation;
   a second brake (66) releasably holding the second sun gear (32) against rotation;
   a third clutch (60) releasably connecting the second sun gear (32) and the third sun gear (42); and
   a fourth clutch (64) releasably connecting the third carrier (48) and the first input.

4. The power transmission of claim 3, wherein each forward and reverse gear produced by the power transmission results from concurrent engagement of three of the clutches and brakes and concurrent disengagement of three of the clutches and brakes.

5. The power transmission of claim 3, further comprising a one-way brake arranged in parallel with the first brake for releasably holding the third carrier (48) against rotation.

6. A power transmission, comprising:
   an input (10);
   an output (12);
   a first sun gear (22) fixed against rotation;
   a first ring gear (24) connected to the input (10);
   a first carrier (26);
   first pinions (28) supported on the first carrier and meshing with the first sun gear and the first ring gear;
   a second sun gear (32);
   a second ring gear (34) connected to the first carrier;
   a second carrier (36);
   second pinions (38) supported on the second carrier and meshing with the second sun gear and the second ring gear;
   a third sun gear (42);
   a fourth sun gear (44);
   a third ring gear (46) connected to the output;
   a third carrier (48);
   third pinions (50) supported on the third carrier and meshing with the third sun gear and the third ring gear; and
   fourth pinions (52) supported on the third carrier and meshing with the fourth sun gear and the third pinions.

7. The power transmission of claim 6, further comprising:
   a first clutch (56) releasably connecting the second carrier (36) and the fourth sun gear (44);
   a second clutch (58) releasably connecting the second carrier (36) and the third sun gear (42);
   a first brake (62) releasably holding the third carrier (48) against rotation;
   a second brake (66) releasably holding the second sun gear (32) against rotation;
   a third clutch (60) releasably connecting the second sun gear (32) and the third sun gear (42); and
   a fourth clutch (64) releasably connecting the third carrier (48) and the input.

8. The power transmission of claim 7, further comprising a one-way brake arranged in parallel with the first brake for releasably holding the third carrier (48) against rotation.

9. The power transmission of claim 7, wherein each forward and reverse gear produced by the power transmission results from concurrent engagement of three of the clutches and brakes and concurrent disengagement of the three of the clutches and brakes.

10. A power transmission, comprising:
    an input (82);

a gearset connected to the input and including a gearset output that has lower speed than a speed of the input;
an output (84);
a first sun gear (98);
a first ring gear (100) driven by the output of the gearset;
a first carrier (102);
first pinions (104) supported on the carrier and meshing with the first sun gear and the first ring gear;
a second sun gear (112);
a second ring gear (116) connected to the output;
a third ring gear (118);
a second carrier (122);
second pinions (126) supported on the second carrier and meshing with the second sun gear and the second and third ring gears;
a third sun gear (114) connected to the second sun gear;
a fourth ring gear (120);
a third carrier (124) connected to the third ring gear; and
third pinions (128) supported on the third carrier and meshing with the third sun gear and the fourth ring gear.

11. The power transmission of claim 10, further comprising:
a sun gear (88) of the gearset being fixed against rotation;
a ring gear (90) of the gearset being connected to the input (82);
a carrier (92) of the gearset being the output of the gearset and connected to the first ring gear; and
pinions (94) of the gearset supported on the carrier and meshing with the sun gear and the ring gear.

12. The power transmission of claim 10, further comprising:
a first clutch (138) releasably connecting the first carrier (102) and the fourth ring gear (120);
a second clutch (130) releasably connecting the first carrier (102) to the second and third sun gears (112, 114);
a first brake (106) releasably holding the first sun gear (98) against rotation;
a second brake (134) releasably holding the second carrier (122) against rotation;
a third clutch (136) releasably connecting the input (82) and the second carrier (122); and
a fourth clutch (132) releasably connecting the first sun gear (98) to the second and third sun gears (112, 114).

13. The power transmission of claim 12, wherein each forward and reverse gear produced by the power transmission results from concurrent engagement of three of the clutches and brakes and concurrent disengagement of three of the clutches and brakes.

14. The power transmission of claim 12, further comprising a one-way brake arranged in parallel with the second brake for releasably holding the second carrier (122) against rotation.

15. A power transmission, comprising:
an input (82);
an output (84);
a first sun gear (88) fixed against rotation;
a first ring gear (90) connected to the input (82);
a first carrier (92);
first pinions (94) supported on the first carrier and meshing with the first sun gear and the first ring gear;
a second sun gear (98);
a second ring gear (100) connected to the first carrier;
a second carrier (102);
second pinions (104) supported on the second carrier and meshing with the second sun gear and the second ring gear;
a third sun gear (112);
a third ring gear (116) connected to the output;
a fourth ring gear (118);
a third carrier (122);
third pinions (126) supported on the third carrier and meshing with the third sun gear, the third ring gear and the fourth ring gear;
a fourth sun gear (114) connected to the third sun gear;
a fifth ring gear (120);
a fourth carrier (124) connected to the fourth ring gear; and
fourth pinions (128) supported on the fourth carrier and meshing with the fourth sun gear and the fifth ring gear.

16. The power transmission of claim 15, further comprising:
a first clutch (138) releasably connecting the second carrier (102) and the fifth ring gear (120);
a second clutch (130) releasably connecting the second carrier (102) to the third and fourth sun gears (112, 114);
a first brake (106) releasably holding the second sun gear (98) against rotation;
a second brake (134) releasably holding the third carrier (122) against rotation;
a third clutch (136) releasably connecting the input (82) and the third carrier (122); and
a fourth clutch (132) releasably connecting the second sun gear (98) to the third and fourth sun gears (112, 114).

17. The power transmission of claim 16, further comprising a one-way brake arranged in parallel with the second brake for releasably holding the third carrier (122) against rotation.

18. The power transmission of claim 16, wherein each forward and reverse gear produced by the power transmission results from concurrent engagement of three of the clutches and brakes and concurrent disengagement of the three of the clutches and brakes.

19. A power transmission, comprising:
a first input (10, 82);
a second input constrained to rotate at a lower speed than a speed of the first input;
an output (12, 84);
a first planetary gearset having first (32, 98), second (36, 102), and third (34, 100) rotating elements, the third rotating element connected to the second input;
a second planetary gearset having fourth (44, 120), fifth (46, 116), sixth (48, 122), and seventh (42, 112) elements, the fifth rotating element connected to the output;
a first clutch (56, 138) releasably connecting the second rotating element (36, 102) and the fourth rotating element (44, 120);
a second clutch (58, 130) releasably connecting the second rotating element (36, 102) and the seventh rotating element (42, 112);
a first brake (62, 134) releasably holding the sixth rotating element (48, 122) against rotation;
a second brake (66, 106) releasably holding the first rotating element (32, 98) against rotation;
a third clutch (60, 132) releasably connecting the first rotating element (32, 98) and the seventh rotating element (42, 112); and
a fourth clutch (64, 136) releasably connecting the sixth rotating element (48, 122) and the first input.

20. The power transmission of claim 19, further comprising:
a first sun gear (22, 88) fixed against rotation;
a first ring gear (24, 90) connected to the first input (10, 82);
a first carrier (26, 92) driveably connected to the second input; and first pinions (28, 94) supported on the first carrier and meshing with the first sun gear and the first ring gear.

21. The power transmission of claim 19, wherein the first planetary gearset comprises:
    a second sun gear (32, 98);
    a second ring gear (34, 100) connected to the second input;
    a second carrier (36, 102); and
    second pinions (38, 104) supported on the second carrier and meshing with the second sun gear and the second ring gear.

22. The power transmission of claim 19, wherein the second planetary gearset comprises:
    a third sun gear (42);
    a fourth sun gear (44);
    a third ring gear (46) driveably connected to the output;
    a third carrier (48);
    third pinions (50) supported on the third carrier and meshing with the third sun gear and the third ring gear; and
    fourth pinions (52) supported on the third carrier and meshing with the fourth sun gear and the third pinions.

23. The power transmission of claim 19, wherein the second planetary gearset comprises:
    a third sun gear (112);
    a third ring gear (116) connected to the output;
    a fourth ring gear (118);
    a third carrier (122);
    third pinions (126) supported on the third carrier and meshing with the third sun gear, the third ring gear and the fourth ring gear;
    a fourth sun gear (114) connected to the third sun gear;
    a fifth ring gear (120);
    a fourth carrier (124) connected to the fourth ring gear; and
    fourth pinions (128) supported on the fourth carrier and meshing with the fourth sun gear and the fifth ring gear.

\* \* \* \* \*